US006959620B2

(12) United States Patent
Allner et al.

(10) Patent No.: US 6,959,620 B2
(45) Date of Patent: Nov. 1, 2005

(54) DEVICE FOR BALANCING OF A RADIAL THREADED SPINDLE ECCENTRICITY OF A SPINDLE DRIVE

(75) Inventors: Ralf Allner, Esslingen (DE); Thomas Biber, Aalen (DE)

(73) Assignee: Eastman Kodak Company, Rochester, NY (US)

( * ) Notice: Subject to any disclaimer, the term of this patent is extended or adjusted under 35 U.S.C. 154(b) by 382 days.

(21) Appl. No.: 10/016,719

(22) Filed: Dec. 10, 2001

(65) Prior Publication Data

US 2002/0069714 A1 Jun. 13, 2002

Related U.S. Application Data

(60) Provisional application No. 60/271,327, filed on Feb. 23, 2001.

(30) Foreign Application Priority Data

Feb. 25, 2000 (DE) .......................................... 100 08 908

(51) Int. Cl.$^7$ ............................ F16H 1/26; F16H 3/06; F16H 27/02; F16H 29/02

(52) U.S. Cl. ..................................... 74/89.36; 74/89.23

(58) Field of Search ............................. 74/89.36, 89.23

(56) References Cited

U.S. PATENT DOCUMENTS

| | | | | | |
|---|---|---|---|---|---|
| 3,464,283 | A | * | 9/1969 | Miller et al. | 74/89.36 |
| 4,274,293 | A | * | 6/1981 | Ruger | 74/89.36 |
| 4,326,643 | A | * | 4/1982 | Bayne et al. | 221/13 |
| 4,530,251 | A | * | 7/1985 | Henle | 74/89.36 |
| 4,572,014 | A | * | 2/1986 | Kluczynski | 74/89.36 |
| 4,957,013 | A | * | 9/1990 | Broghammer et al. | 74/89.36 |
| 5,331,861 | A | * | 7/1994 | Joffe | 74/89.36 |
| 5,524,499 | A | * | 6/1996 | Joffe | 74/89.36 |
| 5,689,995 | A | * | 11/1997 | Heckel, Jr. | 74/89.39 |
| 6,003,394 | A | * | 12/1999 | Heckel, Jr. | 74/89.36 |
| 6,024,697 | A | * | 2/2000 | Pisarik | 600/224 |

FOREIGN PATENT DOCUMENTS

| | | | |
|---|---|---|---|
| DD | 14 10 129 A1 | 4/1980 | B66F/7/00 |
| DD | 238 601 A1 | 8/1986 | B66F/7/14 |
| DE | 24 17 645 | 10/1975 | B66F/7/14 |
| FR | 53 985 | 1/1947 | B66F/7/14 |

* cited by examiner

*Primary Examiner*—Robert A. Siconolfi
(74) *Attorney, Agent, or Firm*—Lawrence P. Kessler

(57) ABSTRACT

A device for balancing eccentricity of a spindle drive (1) to avoid blocking of the spindle drive during lifting movement of a platform (2), in which the platform is mounted on several axiparallel spindles (G1; G2; G3; G4) by bearing devices (L1; L2; L3; L4) arranged on it and can be lifted together with the bearing devices axially along the spindle. The spindle drive (1) has at least three axiparallel, rotatable threaded spindles (G1; G2; G3; G4) with bearing device (L1; L2; L3; L4) in a polygonal arrangement; low-friction bearing devices (L1; L2; L3; L4) with radial bearing clearance (F1; F2) are arranged to balance the radial eccentricity of the rotating threaded spindles so that a relative radial movement of the rotating spindles to platform (2) is possible with limited force expenditure.

11 Claims, 7 Drawing Sheets

DEVICE FOR BALANCING OF A RADIAL THREADED SPINDLE ECCENTRICITY OF A SPINDLE DRIVE

This application claims the benefit of provisional application 60/271,327 filed on Feb. 23, 2001.

FIELD OF THE INVENTION

The invention concerns a device for balancing a radial threaded spindle eccentricity of a spindle drive to avoid blocking of the spindle drive during the lifting movement of a platform, especially the lifting movement of the platform with objects in a machine.

BACKGROUND OF THE INVENTION

Spindle drives are known in which the platform is mounted by several bearing devices arranged on it on several axiparallel spindles and can be moved together with the beating devices axially along the spindles and in which one of the spindles is a rotating threaded spindle on which a bearing device having a spindle nut is arranged and one of the bearing devices has radial play to balance the radial threaded spindle eccentricity.

U.S. Pat. No. 4,326,643 (in the name of Bayne, et al; issued Apr. 27, 1982) discloses such a device for vertical lifting and lowering of a stack of flat objects (magnetic cards) in a card delivery machine, in which a platform or container carrying the stack can be moved by a spindle drive having a threaded spindle and a cylinder shaft in the vertical lifting direction and the platform during the lifting movement is guided by the cylinder shaft arranged axiparallel to the threaded spindle and at a spacing from it and secured against horizontal pivoting. The platform is mounted on the threaded spindle by a spindle nut and on the cylinder shaft by a bearing bush.

In order to avoid jamming of the platform against the cylinder shaft caused by the threaded spindle eccentricity or blocking or stiff movement of the platform, the spindle nut is arranged freely moveable in the form of a rectangular block (spherical cap) in a pocket-like bearing cavity (in the region of a U-shaped recess) on one of the sides of the platform loosely, i.e., in a horizontal plane radially around the threaded spindle. The horizontal and radial movement freedom of the spindle nut relative to the platform is slightly greater than the radial eccentricity of the threaded spindle.

A drawback of this disclosed variant is that because of the use of the single threaded spindle for the lifting movement of the platform carrying the stack, in heavy stacks tilting and therefore jamming or clamping of the platform against the cylinder shaft or the threaded spindle can occur. Moreover, high friction forces from surface friction between the spindle nut (spherical cap) and platform in the bearing cavity during horizontal radial movement of the spindle nut against the platform caused by the spindle eccentricity to occur because of the design of the bearing site in heavy stacks, which favor jamming of the platform against the cylinder shaft and causes high material abrasion at the bearing site.

SUMMARY OF THE INVENTION

The underlying task of the invention is therefore to create a device that does not exhibit the mentioned drawbacks, but guarantees efficient lifting movement of a platform true to position and free of jamming even with heavy loads in an automatically operating machine and also has a simple low-wear design.

The task is solved according to the invention with a device wherein the spindle drive has at least three axiparallel, rotatable, threaded spindles with bearing devices with different or the same bearing clearance in a polygonal arrangement and low-friction bearing devices with radial bearing clearance are arranged to balance the radial eccentricity of the rotating threading spindles so that a relative radial movement of the rotating spindles relative to the platform is possible with limited fiction force.

In a first bearing device, the platform is advantageously arranged essentially radially free of play on a first spindle, a second bearing device has radial bearing clearance on both sides of a second spindle, which is prescribed to run radially linear back-and-forth from the first spindle, and the third and additional bearing devices are arranged with radial bearing clearance effective all around the connected third and additional spindles; or in an alternative variant, all the bearing devices arranged on the threaded spindles of the platform have bearing clearance that is active radially all around.

The task is also solved with a device according to the invention wherein the bearing devices each have an annular ball bearing arranged concentrically around the spindle, by which the radial bearing clearance between the platform and the spindles to balance the threaded spindle eccentricity can be produced free of friction.

Advantageously the ball bearings each have a first plane bearing shell aligned perpendicular to the lifting movement and a second plane bearing shell aligned plane-parallel to the first, between which, held by an annular cage, the balls of the corresponding ball bearings arc mounted to rotate freely, the first bearing shell of the ball bearing being rigidly connected to a spindle nut of the bearing device and the second bearing shell being rigidly connected to the platform or in an alternative variant the bearing devices each have an annular bearing arranged concentrically around a threaded spindle, in which a first concave, ball-guiding bearing shell of the ball bearing is rigidly connected to the spindle nut and the second bearing shell is rigidly connected to the platform in a position plane-parallel to the first bearing shell and has a plane contact side for the balls.

Additional features and advantages can be deduced from the description of the practical examples of the invention shown in the drawing and the additional subclaims.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENTS

The following description according to FIGS. 1 to 5 refers to a preferred variant of the device according to the invention for balancing of a threaded spindle eccentricity in order to avoid blocking or jamming of a spindle drive 1 having several spindles, which is provided for lifting movement of a platform 2 carrying a sheet stack S of a sheet feed magazine in an ordinary sheet processing machine (not shown), for example, a copier. Individual sheets can be automatically removed in succession from the sheet stack lying or positioned on the platform by an ordinary sheet removal/transport unit of the copier (not shown) and fed to one or more sheet processing stations of the copier.

It is self-evident to one skilled in the art active in this field that the device according to the invention can also be used in other machines, for example, in delivery or feed devices for cards or other stackable objects, as well as in printers or sheet machines.

Figure 1:
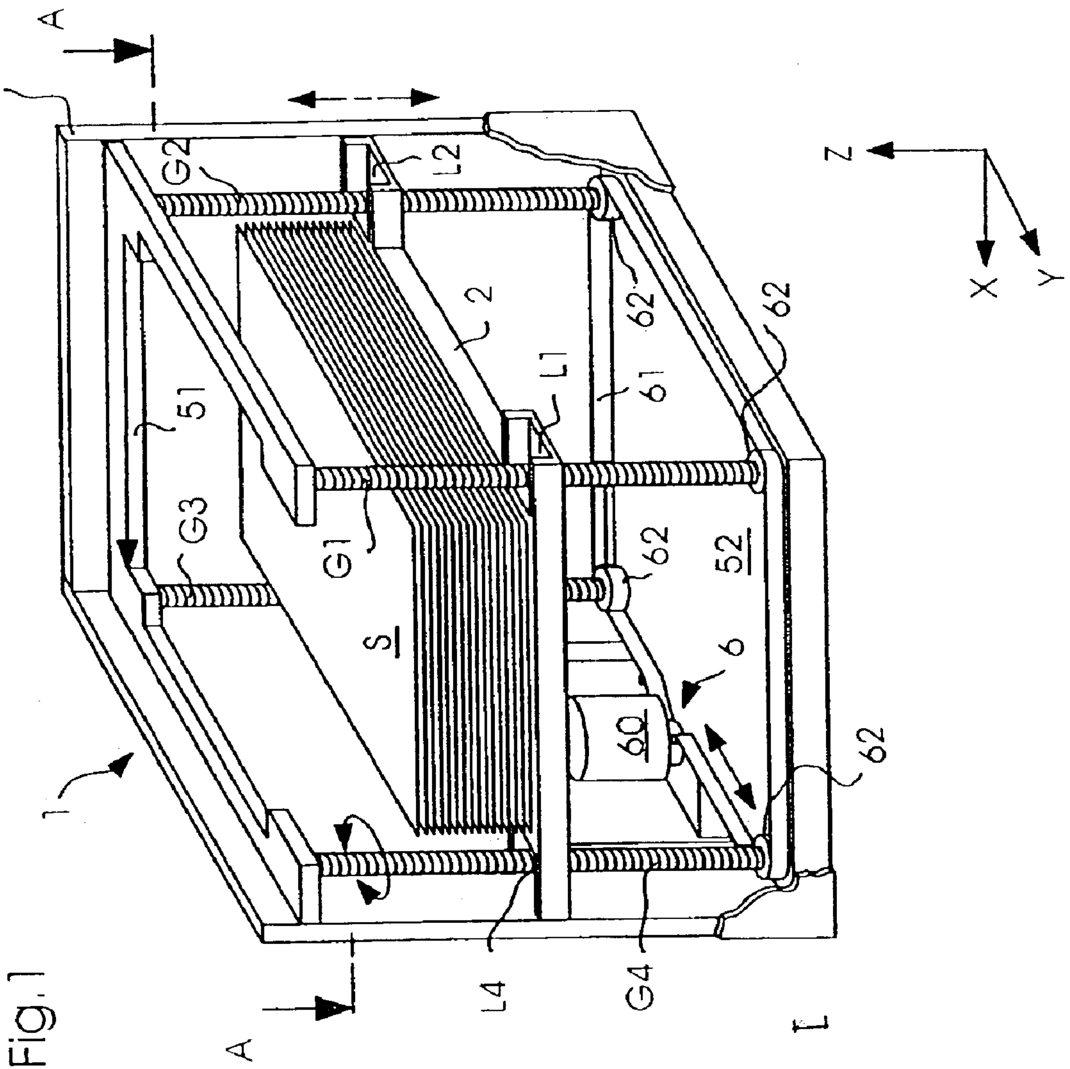
FIG. 1 shows a spindle drive with the device according to the invention in a three-dimensional (schematic) view through an opening of a housing.

The device according to the invention having a spindle drive 1, depicted in FIG. 1 in a three-dimensional schematic view through an opening of a machine housing 5, has an upper 51 and a lower 52 essentially rectangular bearing plate 2 within the machine housing 5 with four spindles mounted between them in axiparallel, vertical alignment on four corner points of the bearing plates 51;52 in the form of threaded spindles G1; G2; 03; G4. The upper bearing plate 51 has a recess for access to the top of sheet stack S by band and/or by sheet removal/transport unit, so that only an edge region of the bearing plate remains in the form of a U.

The platform 2 is mounted on corresponding threaded spindle G1; G2; G3; G4 by four bearing devices L1; L2; L3; L4 arranged on it, which according to FIG. 2 have different radial bearing clearance F1; F2 in the horizontal directions X, Y.

Figure 2:
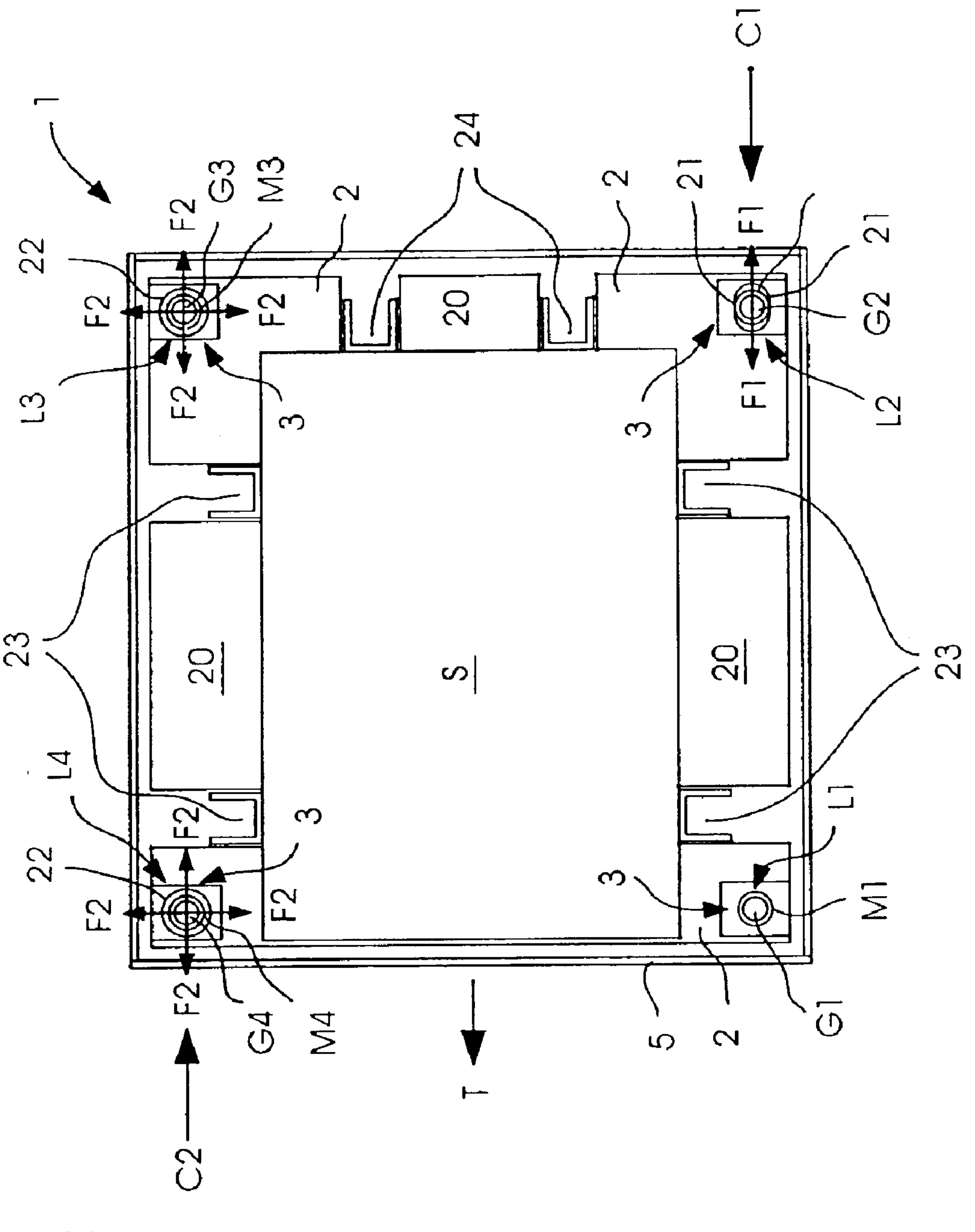
FIG. 2 shows the device according to the invention according to FIG. 1 in the view from the top and along a line A—A.
Figure 5:
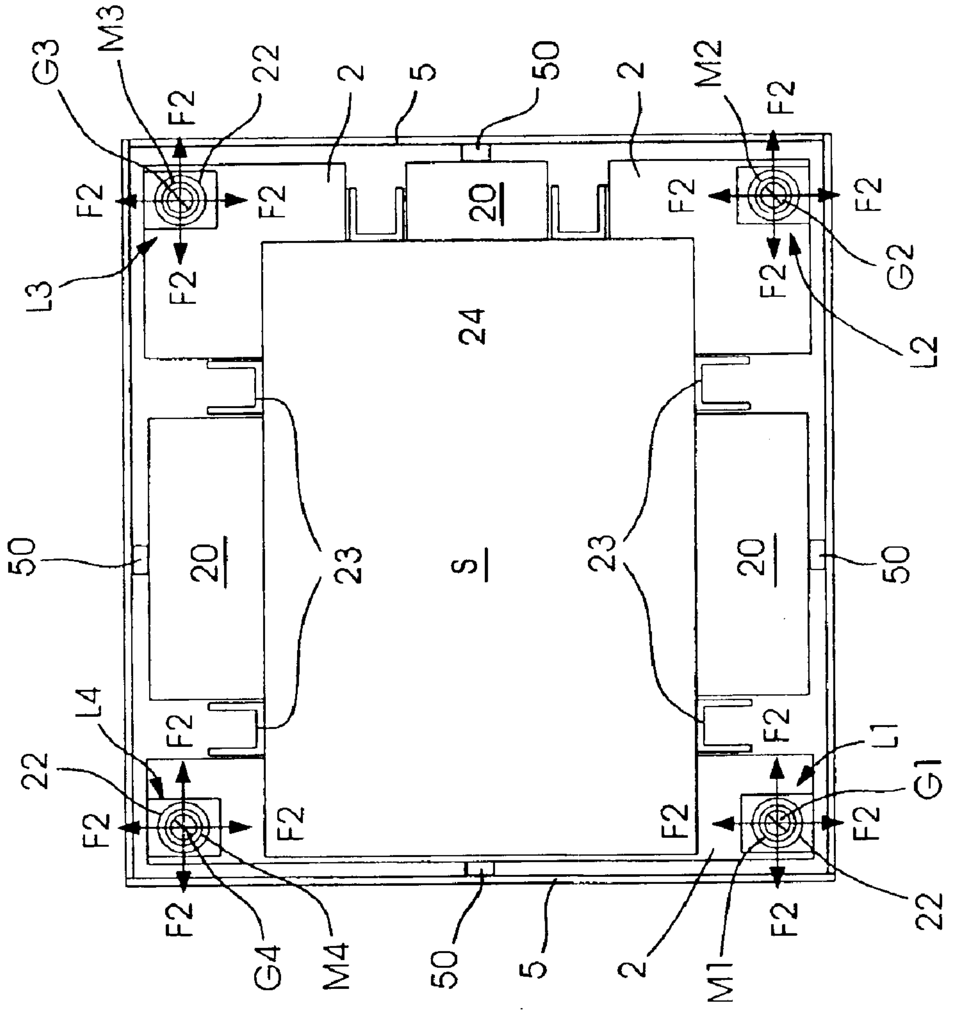
FIG. 5 shows the device according to the invention according to FIG. 2 in an alternative variant with limitation means to prevent horizontal movement of the platform.

To hold and guide the sheet stack S, as shown in FIGS. 2 and 5, several adjustable side stops 23 and rear stops 24 are made on a bottom plate 20 arranged on platform 2, which extend in the lifting direction and act laterally on the sheet stack. These stops are omitted in FIG. 1 for a clearer depiction of the invention.

Platform 2 can be lifted together with the bearing devices axially along the spindles vertically in direction Z, for which purpose all threaded spindles G1; G2; G3; G4 of the spindle drive 1 can be driven to rotate synchronously by a single microprocessor-control drive unit 6. The drive unit 6 is controllable by an ordinary control unit and sensor unit (not shown) of the copier in its rotational direction and rotation time and has a drive motor 60 with a drive pinion, as well as a drive belt 61 in the form of a toothed belt that can be driven over the drive pinion. The toothed belt 61 then moves around all pulleys 62 which are arranged concentrically on the threaded spindles G1; G2; G3; G4 in the region of the lower bearing plate 52 and connected rigidly to them.

In the preferred variant of the invention according to FIGS. 1 and 2 a first bearing device L1 of the platform is arranged essentially radially and free of clearance on a first spindle G1, a second bearing device L2 according to FIGS. 1 to 4*a* has a radial bearing clearance F1 on both sides of the second spindle G2 in direction Y, which is prescribed to run radially linear back-and-forth from the first spindle G1 and the third and additional bearing devices L3, L4 according to FIGS. 1, 2, 4*b* and 4*c* are arranged with bearing clearance F2 effective all the way around (in directions X and Y) the corresponding third and additional spindles G3, G4. During the lifting movement of platform 2 during a spindle eccentricity of threaded spindles G1–G4, a horizontal movement of platform 2 is obtained in direction X or across the transport direction T of sheet S (see FIG. 2), which is determined by the spindle eccentricity of the threaded spindle G1 and G2 and a horizontal movement in direction Y or along the transport direction T, which is only determined by the spindle eccentricity from threaded spindle G1.

Figure 3:
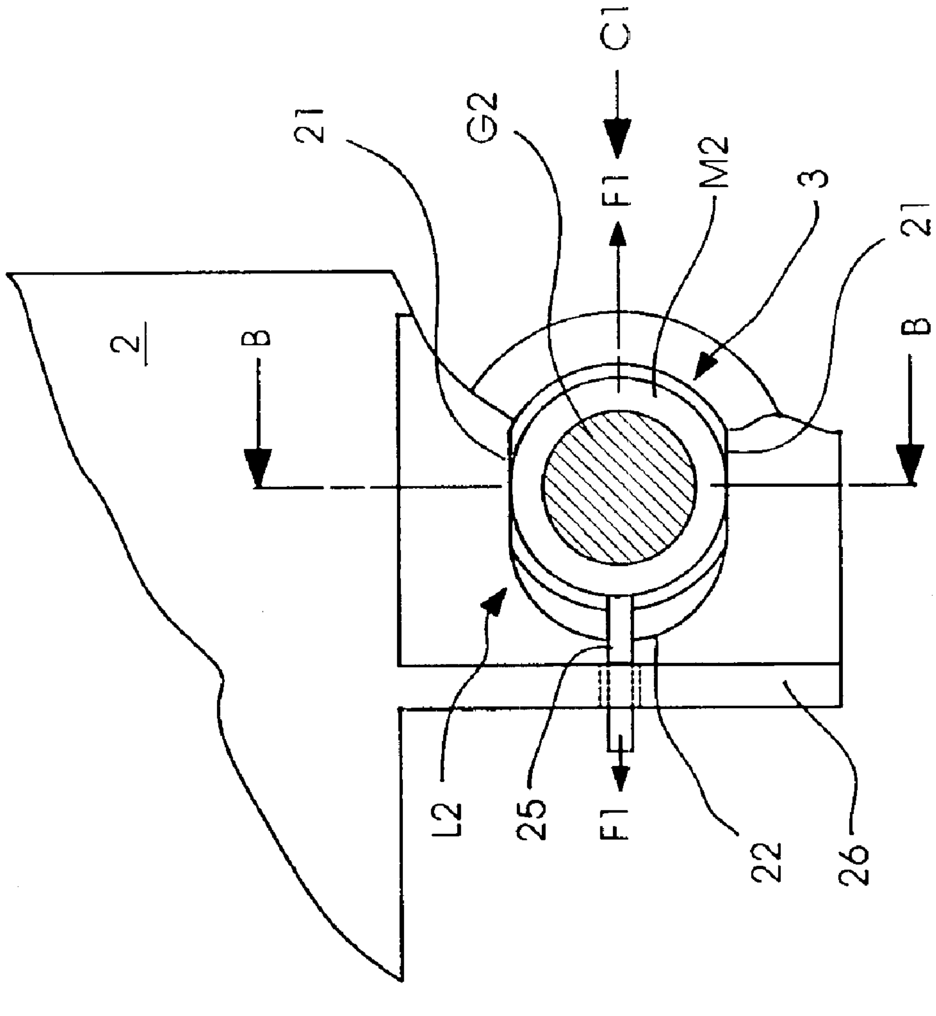
FIG. 3 shows the device according to the invention according to FIG. 2 in an enlarged partial view from the top and through an opening in the platform.
Figure 4A:
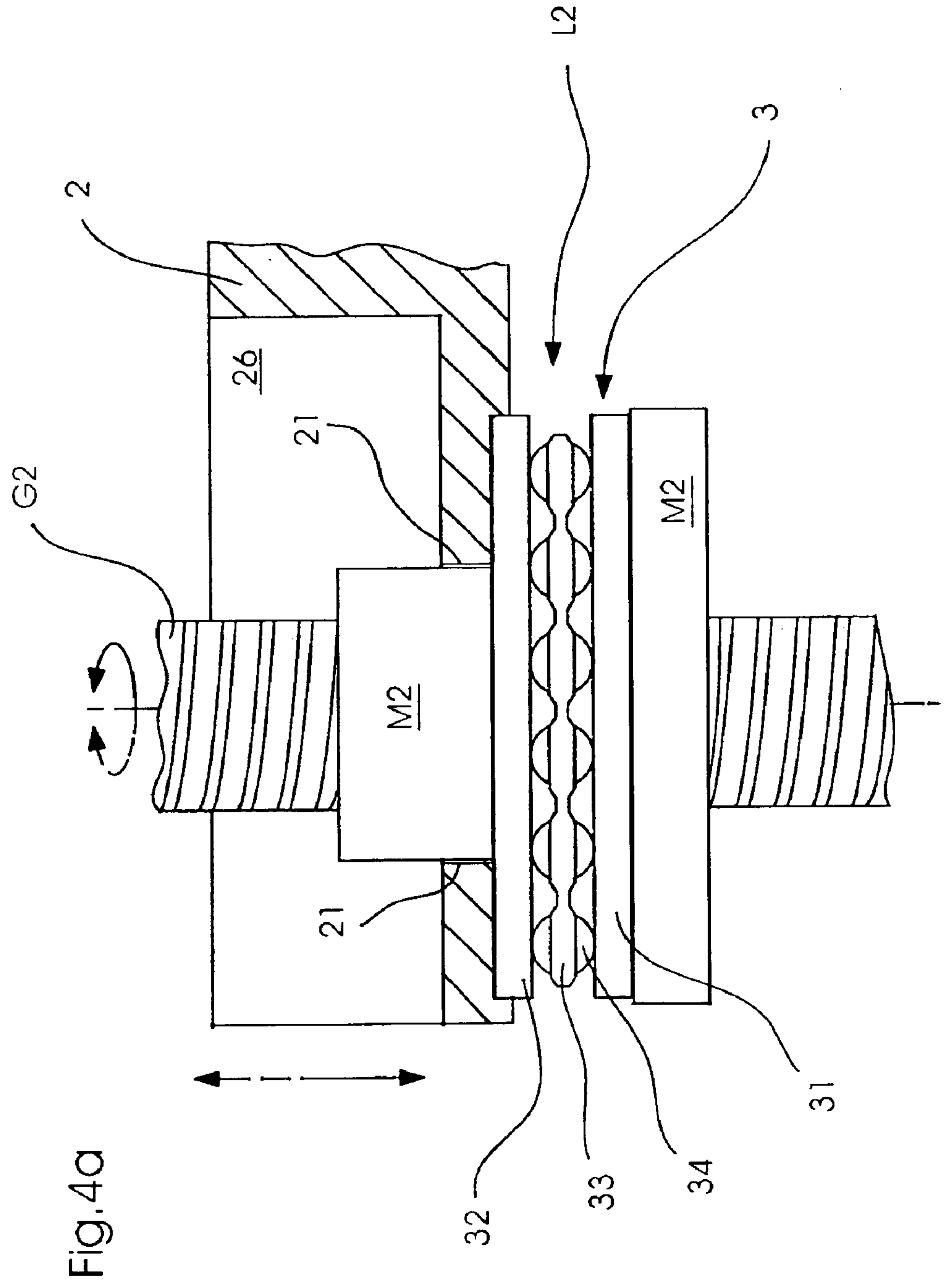
FIG. 4*a* shows the device according to the invention according to FIGS. 2 and 3 in a partially opened side view from direction C1.

The bearing devices L1; L2; L3; L4 of platform 2 are arranged in the variant according to the invention as low-friction bearing devices with radial clearance F1; F2 to balance the radial eccentricity of the rotating threaded spindles G1; G2; G3; G4 so that a relative radial movement of the rotating spindle G1; G2; G3; G4 to platform 2 is possible with limited friction force and limited force expenditure. As shown in FIGS. 3, 4*a* and 4*c*, the bearing devices L1; L2; L3; L4 then each have an annular ball bearing 3 arranged concentrically around spindles G1; G2; G3; G4, by which the radial bearing clearance F1 and F2 between platform 2 and the spindles can be produced to balance the threaded spindle eccentricity in low-fiction fashion.

Figure 4B:
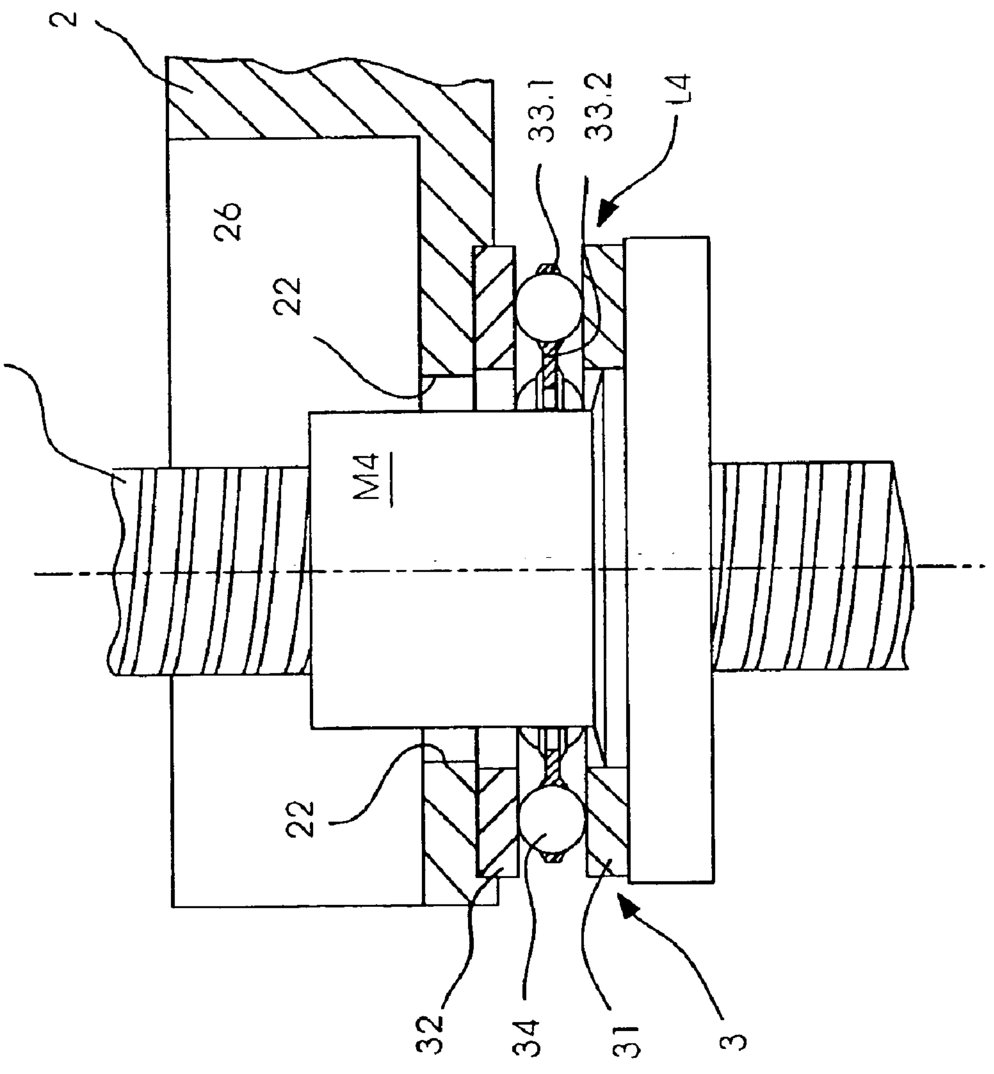
FIG. 4*b* shows the device according to the invention according to FIGS. 2 and 3 in a side view from direction C2 along line B—B.
Figure 4C:
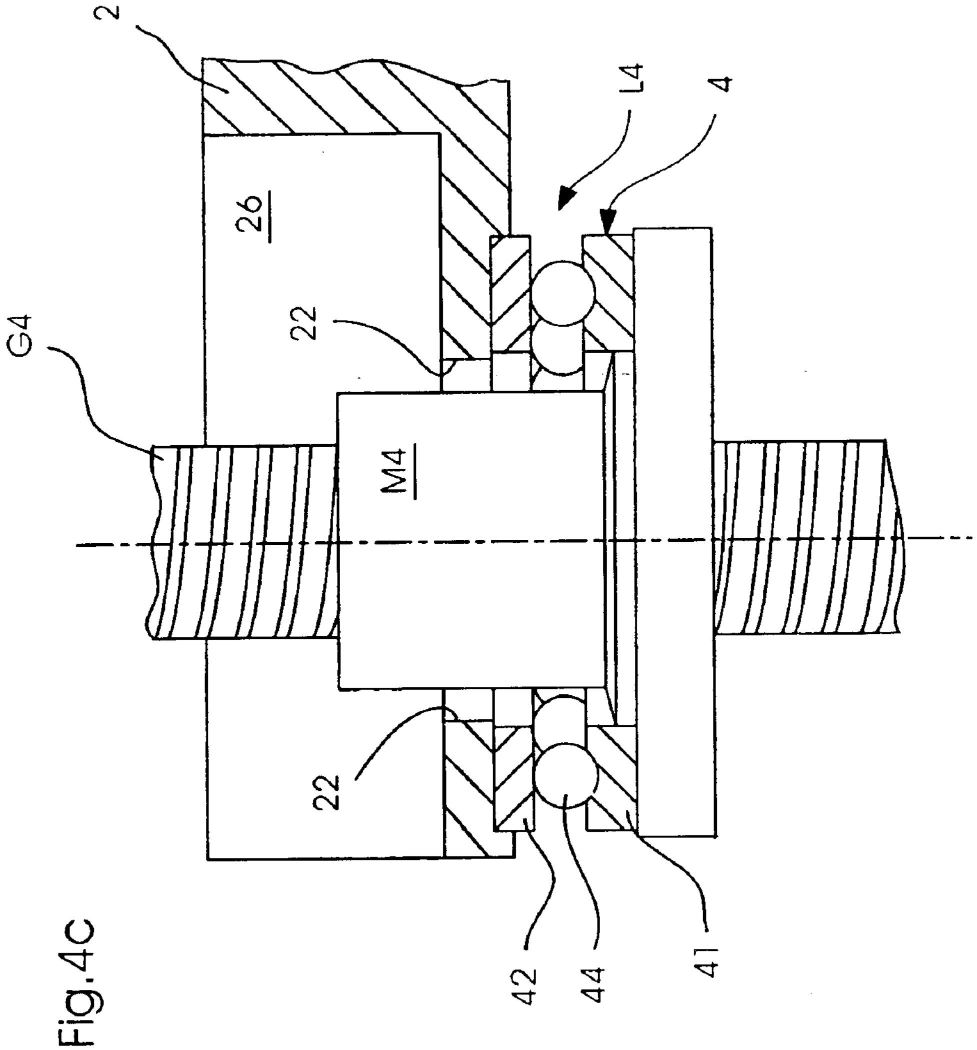
FIG. 4*c* shows the device according to the invention according to FIG. 4*b* with an alternative variant of the bearing device with concave, ball-guiding bearing shell on the ball bearing.

As shown in FIGS. 3, 4*a*–4*b*, each ball bearing 3 has a first plane lower annular bearing shell 31 aligned perpendicular to the lifting movement and a second plane upper annular bearing shell 32 aligned plane-parallel to the first; between which, the balls 34 of the ball bearings, held by an annular cage 33; 33.1; 33.2 are mounted to rotate freely, the first bearing shell 31 of ball bearing 3 being rigidly connected to a corresponding spindle nut M1; M2; M3; M4 of the bearing devices L1; L2; L3; L4 and the second bearing shell 32 being rigidly connected to platform 2.

The bearing shells 31; 32 have a plane support width for ball 34 in the radial direction, which is larger than the maximum radial bearing clearance F1; F2 predetermined by the maximum spindle eccentricity and the ball cage 33 has an outer 33.1 and an inner 33.2 annular element around the balls 34 in a concentric arrangement around spindle G1; G2; G3; G4 and around the spindle nuts M1; M2; M3; M4, the inner annular element 33.2 having an inside diameter that essentially corresponds to the outside diameter of spindle nut M1; M2; M3; M4.

In an alternative variant according to FIG. 4*c*, the bearing devices L1; L2; L3; L4 each have an alternative annular ball bearing 4 arranged concentrically around a threaded spindle G1; G2; G3; G4, which has a first lower, concave, ball-guiding bearing shell 41 of ball bearing 4, which is rigidly connected to a corresponding spindle nut M1; M2; M3; M4 of bearing device L1; L2; L3; L4, and whose second, upper bearing shell 42 is connected in a plane-parallel position relative to the first bearing shell 41 to platform 2 and has a plane support side for the freely rotating balls 44 of ball bearing 4.

The spindle nuts M1; M2; M3; M4 arranged on the threaded spindles G1; G2; G3; G4 and liftable by rotation of the spindle, as shown in FIGS. 4*a* and 4*b*, have a cylindrical shape or a cylindrical shaft extending axially to the axis of rotation of the spindle, a radially protruding cylindrical flange being applied concentrically on the lower end of each spindle nut. The lower/first annular bearing shell 31 is arranged lying on this flange of the spindle nut, centered by a concentric annular element of the flange having a smaller diameter and rigidly connected to the flange (for example, by press fitting from the inside periphery of bearing shell 31 to the outside periphery of the annular element).

Each upper/second annular bearing shell 32 of ball bearing 33 is rigidly arranged on a bottom of platform 2 or its bearing sites L1; L2; L3; L4 in the region of a passage opening to the corresponding spindle G1; G2; G3; G4 in an annular recess, for example, by press fitting from the outside periphery of bearing shell 32 to the inside periphery of the recess of platform 2. The upper bearing shell 2 of ball bearing 3 and the spindle passage opening on platform 2 have an inside diameter of their passage opening whose radius is greater by the amount of required predetermined radial bearing clearance F1; F2 of the individual bearing sites of the bearing devices L1; L2; L3; L4 than a radius of the outside diameter of the upper cylinder shaft of spindle M1; M2; M3; M4 protruding upward through the passage openings. The outside diameter of the upper cylinder shaft of the spindle nut then also serves for centering and guiding of the inner annular element 33.2 of the annular ball cage 33.

A limitation of the radial bearing clearance F1; F2 between bearing devices L1; L2; L3; L4 of the bearing sites or platform 2 and the spindles G2; G3; G4 and the spindle nuts M1; M2; M3; M4 can be produced by limiting devices 21; 22 of platform 2 arranged on platform 2 and engaging the spindle nuts radially outward, i.e., the inside edge of the spindle passage openings on the bearing sites L2; L3; L4 is a limiting device 21; 22 for the radial bearing clearance F1; F2.

In order to guarantee that the spindle nuts M1; M2; M3; M4 and thus the platform 2 can be moved upward and downward in one lifting movement, i.e., the spindle nuts are not corotated with the threaded spindles G1; G2; G3; G4, the spindle nuts are loosely coupled to the bearing sites L1; L2; L3; L4 or to platform 2 by holding devices, for example, in the form of mounting bolts 25 (see FIG. 3). For this purpose, the mounting bolt 25 is connected rigidly to the cylinder shaft of spindle nuts M2; M3; M4 and protrudes with its opposite end, freely mobile in the axial direction (according to the varying play F1) through a guide hole on a connector 26 of the platform or within the platform-bearing site L2; L3; L4. The guide hole is then chosen in diameter large enough that the radial bearing clearance F2 is guaranteed through the circular horizontal movement of the mounting ball 25. An exception is the bearing site L1 with spindle nut M1, since this spindle nut can be rigidly and directly connected with its cylinder shaft to platform 2 because of the predetermined bearing site L1 free of clearance.

In another variant of the invention depicted in FIG. 5, ball bearing devices L1; L2; L3; L4 of platform 2 arranged on the threaded spindles G1; G2; G3; G4 and spindle nuts M1; M2; M3; M4 have identical or also nonidentical/different bearing clearance F2 that acts radially all the way around. For limitation of the radial bearing clearance F2 between the bearing devices 3; M1; M2; M3; M4 of the bearing sites L1; L2; L3; L4 and the spindles G1; G2; G3; G4 and to avoid horizontal radial movement of platform 2 in the X/Y direction during its lifting movement, fixed limiting devices 50 on the apparatus side are arranged, which engage at right angles to the lifting movement on all four sides of the platform 2 or on the bottom plate 20 for the sheet stack stops 23; 24. The limitation devices 50 are, for example, ribs or connectors, as a component of the spindle drive housing 5 and extend over the entire lifting height of platform 2 along the lifting movement.

In another alternative variant of the invention (not shown), the spindles G1; G2; G3; G4 have a combination of threaded spindles and smooth cylinder shafts or cylinder columns, in which the cylinder shafts serve as a guide and as rotational protection and tilting protection for platform 2. The spindle nuts are then replaced by guide sleeves on the cylinder shafts. In addition, only three instead of four spindles are provided in a polygonal or triangular arrangement.

| Parts list | |
|---|---|
| F1 | Radial bearing play having two degrees of freedom on second bearing device |
| F2 | Radial all-round bearing clearance on third and fourth bearing device |
| G1 | First threaded spindle of spindle drive |
| G2 | Second threaded spindle of spindle drive |
| G3 | Third threaded spindle of spindle drive |
| G4 | Fourth threaded spindle of spindle drive |
| L1 | First bearing device (bearing site) of the platform |
| L2 | Second bearing device (bearing site) of the platform |
| L3 | Third bearing device (beating site) of the platform |
| L4 | Fourth beating device (bearing site) of the platform |
| M1 | First spindle nut on first threaded spindle/on first bearing device |
| M2 | Second spindle nut on second threaded spindle/on second bearing device |
| M3 | Third spindle nut on third threaded spindle/on third bearing device |
| M4 | Fourth spindle nut on fourth threaded spindle/on fourth bearing device |
| S | Sheet-like, plate-like objects/object (stacked) |
| T | Horizontal transport direction of the objects/sheets from the stack |
| X | First horizontal movement direction of the platform |
| Y | Second horizontal movement direction of the platform |
| Z | Vertical lifting direction of the platform/spindle drive |
| 1 | Spindle drive with platform |
| 2 | Platform to accept/release objects (sheet/plate stack) |
| 3 | Annular ball bearing with ball cage and plane bearing shell (bearing devices) |
| 4 | Alternative/annular ball bearing with concave/ball-guiding bearing shell |
| 5 | Housing of the spindle drive |
| 6 | Drive unit for threaded spindle for the spindle drive |
| 20 | Bottom plate of the platform for side/rear stops (sheet/plate stack) |
| 21 | First limitation means for radial bearing plate F1/platform movement (component of the platform) |
| 22 | Second limitation means for radial bearing plate F2/platform movement (component of the platform) |
| 23 | Side stop/stops on bottom plate for object/sheets |
| 24 | Rear stop/stops on bottom plate for object/sheet |
| 25 | Mounting bolt for spindle nut mount and guide on platform |
| 26 | Connector/rib on platform for mounting bolt-guide |
| 30 | |
| 31 | First/lower plane bearing shell of the ball bearing |
| 32 | Second/upper plane bearing shell of the ball bearing |
| 33 | Annular cage for the balls |
| 33.1 | Outer annular element of the cage |
| 33.1 | [sic] Inner annular element of the cage |
| 34 | Balls of the ball bearing |
| 40 | |
| 41 | First/lower concave, ball-guiding bearing shell (alternative ball bearing) |
| 42 | Second/upper plane bearing shell of the alternative ball bearing |
| 43 | |
| 44 | Balls of the alternative ball bearing |
| 50 | Alternative limitation means for platform (component of the spindle drive housing) |
| 51 | Upper bearing plate for the threaded spindle |
| 52 | Lower bearing plate for the threaded spindle |
| 60 | Drive motor of the threaded spindle drive unit |
| 61 | Drivebelts |
| 62 | Pulley on threaded spindle |

What is claimed is:

1. Device for balancing of radial eccentricity of a spindle drive (1) to avoid blocking of the spindle drive during lifting movement of a platform (2), comprising: a platform for lifting objects (S) said platform being mounted by several bearing devices (L1; L2; L3; L4) respectively arranged on several axiparallel spindles (G1; (G2; G3; G4), lifted axially along the spindles together, said bearing devices (L1; L2; L3; L4) having respective radial bearing clearances (F1; F2) in a polygonal arrangement; and said bearing devices (L1; L2; L3; L4) being of a low-friction type, and arranged with radial bearing clearance (F1; F2) to balance the radial eccentricity of the rotating threaded spindle so that a relative radial movement of the rotating spindles to platform (2) with limited friction force is possible.

2. Device according to claim 1, wherein a first bearing device (L1) of platform (2) arranged essentially radially on a first spindle (G1) free of play, a second bearing device (L2) having a radial bearing clearance (F1) on both sides of a second spindle (G2), which is prescribed to run radially and linearly back-and-forth from the first spindle (G1), and a third bearing device (L3, L4) arranged with radial bearing clearance (F2) that is active all the way around the third spindle (G3,G4).

3. Device according to claim 1 wherein said bearing devices (L1; L2; L3; L4) each having an annular ball bearing (3) arranged concentrically around the spindle (G1; G2; G3; G4) by which the radial bearing clearance (F1;F2) between platform (2) and the spindle can be produced substantially free of friction to balance the threaded spindle eccentricity.

4. Device according to claim 2, wherein limitation of the radial bearing clearance (F1; F2) between bearing devices (L2; L3; L4) and respective spindles (G2; G3; G4) being produced by limitation devices (21; 22) arranged on platform (2) and engaging the spindles radially.

5. Device according to claim 2, wherein for limitation of the radial bearing clearance (F2) between the bearing devices (L1; L2; L3; L4) and the spindles (G1; G2; G3; G4) and to avoid radial movement of the platform (2), fixed limitation devices (50), arranged on the apparatus side, said fixed limitation devices (50) engage at right angles to the lifting movement on all four sides of platform (2).

6. Device for balancing of radial eccentricity of a spindle drive (1) in order to avoid blocking of the spindle drive during lifting of a platform (2), comprising: a platform for lifting objects (S) in a machine, said platform being mounted by several bearing devices (L1; L2; L3; L4) respectively arranged on several axiparallel spindles (G1; G2; G3; G4), lifted together with the bearing devices axially along the spindles, said bearing devices(L1; L2; L3; L4) each having an annular ball bearing (3) arranged concentrically around the spindles (G1; G2; G3; G4) by which a radial bearing clearance (F1; F2) can be produced between said platform (2) and the spindles to balance the threaded spindle eccentricity in low-friction fashion.

7. Device according to claim 6, wherein said ball bearings (3) each having a first plane bearing shell (31) aligned at right angles to the lifting movement and a second plane bearing shell (32) aligned plane-parallel to said first plane, between which, the balls (34) of each ball bearing are held by an annular cage (33; 33.1; 33.2) and mounted to rotate freely, said first plane bearing shell (31) being rigidly connected to a corresponding spindle (M1; M2; M3; M4), and said second plane bearing shell (32) being rigidly connected to said platform (2).

8. Device according to claim 7, wherein said plane bearing shells (31;32) having a plane support width in the radial direction for said balls (34), which width is greater than the maximum radial bearing clearance (F1; F2) predetermined by the maximum spindle eccentricity, and said ball cage (33; 33.1; 33.2) having an outer (33.1) and an inner (33.2) annular element around said balls (34), in a concentric arrangement around said spindles (G1; G2; G3; G4), the inner annular element (33.2) having an inside diameter that essentially corresponds to an outside diameter of said spindle (M1; M2; M3; M4).

9. Device according to claim 6, wherein said bearing devices (L1; L2; L3; L4) each have an annular ball bearing (4) arranged concentrically around a respective threaded spindle (G1; G2; G3; G4), a first concave, ball-guiding bearing shell (41) of said annular ball bearing being rigidly connected to a spindle (M1; M2; M3; M4), and a second bearing shell (42) rigidly connected to said platform (2) in a plane-parallel position relative to said first bearing shell (41), and a plane support side for said balls (44) of said ball bearing (4).

10. Device according to claim 9, wherein all threaded spindles (G1; G2; G3; G4) of the spindle drive (1) are driven synchronously by a single microprocessor-controlled drive unit (6); and said platform (2) has a vertically directed lifting movement.

11. Device according to claim 10, wherein said spindles (G1; G2; G3; G4) have a combination of threaded spindles and cylinder shafts, said cylinder shafts being used for guiding, and as rotational and tilting protection for, said platform (2).

* * * * *